(12) United States Patent
Schock et al.

(10) Patent No.: US 6,177,179 B1
(45) Date of Patent: Jan. 23, 2001

(54) INTEGRAL, BOARD-LIKE COMPONENT AND PROCESS FOR ITS PRODUCTION

(75) Inventors: Friedrich Schock, Schorndorf; Klaus Hock; Josef Geier, both of Regen; Rudolf Paternoster, Rinchnach; Walter Birnbeck, Spiegelau, all of (DE)

(73) Assignee: Schock & Co. GmbH, Schorndorf (DE)

( * ) Notice: Under 35 U.S.C. 154(b), the term of this patent shall be extended for 0 days.

(21) Appl. No.: 09/042,517

(22) Filed: Mar. 16, 1998

Related U.S. Application Data

(63) Continuation of application No. PCT/EP96/03138, filed on Jul. 17, 1996.

(30) Foreign Application Priority Data

Sep. 22, 1995 (DE) ............................................. 195 35 158

(51) Int. Cl.$^7$ ....................................................... B32B 5/16
(52) U.S. Cl. .......................... 428/218; 428/323; 428/331
(58) Field of Search .................................... 428/323, 212, 428/331, 218, 217

(56) References Cited

U.S. PATENT DOCUMENTS

| | | | |
|---|---|---|---|
| 4,797,315 | * 1/1989 | Balmer et al. | 428/167 |
| 5,218,013 | 6/1993 | Schock | 523/209 |
| 5,344,704 | * 9/1994 | O'Dell et al. | 428/323 |
| 5,425,986 | * 6/1995 | Guyette | 428/283 |
| 5,928,778 | * 7/1999 | Takahashi et al. | 428/323 |

FOREIGN PATENT DOCUMENTS 2 162 787  2/1986  (GB) .

* cited by examiner

Primary Examiner—H. Thi Le

(57) ABSTRACT

With an integral, board-like component, in particular for use as a kitchen working surface, comprising a visible side and a rear side, wherein the visible side comprises a layer consisting of a polymer matrix filled with a first, inorganic filler, its specific density being greater than the specific density of the polymer matrix, it is suggested for the production of the boards in a simple manner and with a good planarity that the filler content of the first filler in the visible side layer be 50 to 90% by volume, that the rear side comprise a layer which is formed from a polymer matrix filled with a second inorganic filler, wherein the proportion of the polymer matrix in this layer in % by volume differs quantitatively by 20% at the most from the volume content of the polymer matrix in the visible side layer and wherein the specific density of the second filler is $\leq 0.6$ g/cm$^3$.

23 Claims, No Drawings

INTEGRAL, BOARD-LIKE COMPONENT AND PROCESS FOR ITS PRODUCTION

This is a continuation of international PCT application No. PCT/EP96/03138 having international filing date of Jul. 17, 1996, which designates the United States.

The present disclosure relates to the subject matter disclosed in International Application No. PCT/EP96/03138 (WO 97/10945) of Jul. 17, 1996, the entire specification of which is incorporated herein by reference.

FIELD OF THE INVENTION

The invention relates to an integral, board-like component, in particular for use as a kitchen working surface, comprising a visible side and a rear side, wherein the visible side comprises a layer consisting of a polymer matrix filled with a first, inorganic filler, the specific density of which is greater than the specific density of the polymer matrix, as well as a process for its production.

The invention also relates to the use of the integral, board-like component not only as a kitchen working surface but also as a partition, facing panel, table top, washstand top in bathrooms, door panel, furniture front or wall paneling.

BACKGROUND OF THE INVENTION

Integral, board-like components of the type described at the outset are known in various forms, for example from DE-38 32 351-A1, according to which a resin with a filler formed at least predominantly of quartz particles has a denser packing of the filler in the regions of the component which are subject to considerable wear and tear during use than on the back of the component.

This is achieved by allowing the filler to settle at least to a certain degree in the case of the casting mass consisting of resin and filler which is filled into the mold, and thus a concentration at the visible side of the component containing the regions subject to wear and tear is achieved.

With this process, components with very good functional properties can be produced, for which reason these components have also found a wide acceptance on the market, in particular in the form of sinks. In particular, the abrasion resistance, the resistance to scratching, the cleanability as well as the granite-like appearance of the visible side resulting from a corresponding selection of the filler number amongst the very good functional properties.

These positive functional properties are also of great value, above all, in the case of board-like materials, such as, for example, working surfaces in the kitchen, washstand tops in the bathroom etc., but it has been found that it is very difficult or even impossible to ensure a good planarity when the components have larger dimensions. In addition, the density of such components is considerably higher than the density which is customarily obtained for chipboard and this results, in the case of working surfaces 20 to 44 mm thick, in components which are very difficult to handle.

When planar components are obtained during production, a bending of the board is observed at the latest during changes in temperature, namely during changes in temperature such as those which often occur during the transportation of such boards in trucks, during which storage (for example overnight in the truck) at temperatures of between −15 and −20° C. very often occurs (for example in Scandinavian countries) while during the day with corresponding sunshine temperatures of up to 80° C. can be reached in the transport vehicle. Short storage times at different temperatures, for example in the range of hours, can already be sufficient to result in a permanent deformation of the board which can no longer be reversed and so the component can no longer be used following transportation.

Alternatively hereto, chipboard is, of course, conceivable as carrier with a thin, filled plastic layer, the filled layer having a similar composition to the visible side of the components described above. The problem with this layered construction is that the overall board is difficult to process since, in principle, different tools are required to machine or process the visible side (thin, filled layer), on the one hand, and the chipboard, on the other. In addition, chipboard has the disadvantage that it swells at higher levels of humidity and, in particular, during direct contact with water and so this type of board can be used, above all, in damp or humid rooms and particularly in kitchens as well only with reservations. The same applies for chipboard with a decorative, high-pressure laminated surface.

SUMMARY OF THE INVENTION

The object of the present invention is to propose an integral board with similar functional properties but produceable in a simple manner with a good planarity and with a large layer thickness, the board being preferably endowed with a low specific weight and, in addition, preferably with a screwing capability such as that applicable for conventional chipboard material.

A board should also preferably be insusceptible with respect to increased humidity and, in particular, direct contact with water.

DESCRIPTION OF THE INVENTION

This object is accomplished in accordance with the invention, in an integral, board-like component of the type mentioned at the outset, in that the filler content of the first filler in the visible side layer is 50 to 90% by volume, that the rear side comprises a layer which is formed from a polymer matrix filled with a second, inorganic filler, wherein the proportion of the polymer matrix in this layer in % by volume differs quantitatively by 20% at the most from the volume content of the polymer matrix in the visible side layer and wherein the specific density of the second filler is less than or equal to 0.6 g/cm$^3$.

With such a board it is ensured, on the one hand, that a sufficiently large filler content is present on the visible side layer to guarantee the good functional properties such as those known from the state of the art while, on the other hand, the construction of the rear side layer with a proportion of the polymer matrix which differs only slightly in % by volume, compared with the visible side layer, not only ensures that the boards can be produced in a relatively simple manner with a very good planarity but also that the planarity of the board is maintained during changes in temperature with differences in temperature of 100° C.

Due to the low density of the second filler, the relatively high density of the filler on the visible side is, as it were, compensated and so components with a specific total density of approximately 0.7 g/cm$^3$ (typical value for chipboard used in a conventional manner) can be achieved.

With a view to a desired long-term stability of the planarity of the board-like component, a zone which essentially comprises no fillers, i.e. consists essentially of pure polymer, is to be avoided between the visible side layer and the rear side layer.

If such formulas are nevertheless intended to be used, a somewhat higher % by volume proportion of the polymer on the visible side layer is selected to better stabilize the planarity of the board-like component and so, in this case, a compensation of stresses can take place.

The cause of stresses occurring in the component, in particular when subjected to changes in temperature, is attributable, in particular, to the fact that the polymers forming the polymer matrix have a coefficient of thermal expansion which is many times greater than that of the inorganic fillers typically used. With a view to this, it is, of course, also possible to provide a certain compensation with a variation of the layer thicknesses and the ratio of the layer thicknesses to one another.

The rear side layer, in particular in parts which are not first of all located on the rear side surface, may comprise hollow spaces such as pores, which serves to further reduce the weight of the board or rather reduce the specific weight of the overall board. However, it is also important in this case for the proportion of the polymer matrix in the rear side layer adjacent to the surface in % by volume to differ quantitatively by 20% at the most from the volume content of the polymer matrix in the visible side layer.

Advantages are obtained during the production of the inventive component with a view to the desired integral layer construction when a layer is arranged between the visible side layer and the rear side layer which comprises reinforcing fibers in a polymer matrix. The reinforcing fibers may be loosely distributed in the polymer matrix or, however, be a fiber fleece or fabric or the like saturated with polymer. A particularly simple mode of production for the inventive board-like component is made possible when the rear side layer and the visible side layer are separated by a zone which comprises a barrier layer which is essentially impermeable for the monomers forming the polymer matrix of the visible side layer but, however, can preferably form a covalent bond with the polymer matrix of the visible side layer and/or of the rear side layer.

During the production of the inventive integral, board-like component, the hardening of the casting masses is preferably started from the visible side, as is likewise provided in the aforementioned state of the art. In order to obtain as far as possible a cavity-free layer on the visible side layer, the formation of monomer gas bubbles and/or the diffusion of monomer into the rear side layer during the increase in temperature normally occurring during the reaction of polymerization, thereby causing monomer-depleted regions to result in the visible side layer, should be avoided since these regions may be visible in some cases from the visible side and give the component an imperfect appearance.

Due to the use of a barrier layer which can be present, in particular, in the form of a film of acrylate polymer, acrylonitrile butadiene styrene copolymer, polystyrene, PVC, polyvinyl acetate, polypropylene, a polyethylene, a polyurethane or polyester, it is possible to avoid the formation of monomer gas bubbles on the visible side layer in the closed mold and thus a visible side layer is achieved which is essentially pore-free and cavity-free and, if desired, is in some cases of a considerable thickness.

It is, however, important that the barrier layer, in particular the film proposed as barrier layer, bonds to the polymer matrix material of the visible side layer and the rear side layer such that a stable, integral, board-like component is obtained. In this case, a barrier layer is preferably used which can form covalent bonds with the polymer matrix not only of the visible side layer but also of the rear side layer during the hardening phase.

In order to keep the barrier layer in the form of the film thin, in order to affect the component properties as little as possible, a protective layer may be applied to the side of the barrier layer facing away from the visible side, this protective layer making it easier to introduce the second casting mass into the mold. This protective layer has, in particular, the form of a fiber fleece, particularly preferred the form of a glass fiber matting.

Paper webs, fabrics consisting of natural or artificial fibers, glass fibers as such and others can function as protective layer, wherein it is important in each case only that the protective layer can be saturated by the monomer of the second polymer matrix so that an adequate integration into the integral component takes place.

Mineral fillers with a Mohs' hardness of $\geq 4$ are possible, in particular, for the first filler and these preferably comprise $SiO_2$ materials, in particular quartz, cristobalite, tridymite, glass or the like, aluminum oxide, ceramic materials, silicon nitride, silicon carbide and granite. Alternatively, materials which have a lower hardness, such as, for example, aluminum hydroxide or marble, can also be considered.

The first filler is preferably used in a granular and/or lamellar form, with a grain size of up to 5 mm being possible in the case of granular fillers.

When required, pigments may be added to the first filler/the first casting mass to achieve special color effects.

With the layer construction of the component, care should be taken that the visible side layer has a thickness of at least approximately 1 mm which, on the other hand, is again already sufficient to achieve an adequate strength to ensure the favorable functional properties specified at the outset.

With preferred integral, board-like components, the polymer matrix of the visible side layer essentially consists of an acrylate polymer, polyester or an epoxy resin. In principle, other polymer matrices are also possible but the aforementioned have, in particular with a view to their intended purpose, prevailed on the market as working surfaces in the kitchen or washstand tops in the bathroom.

The selection of the materials for the polymer matrix of the rear side layer is first of all, in principle, independent of the selection of material of the visible side layer for the polymer matrix but will likewise preferably consist essentially of an acrylate polymer, polyester or an epoxy resin, even more preferred of the same material as the polymer matrix of the visible side layer.

The second filler is preferably selected from materials such as, for example, hollow glass beads, expanded clay, expanded glass, expanded powdered stone, pumice gravel, pumice sand, ceramic hollow beads, metal beads or lightweight fillers which can be obtained under the trade name Sil-cel (the Norwegian Talk company) or Q-cel (the Omya company).

In an additionally preferred embodiment of the component, the second filler is used in a mixture with reinforcing fibers, fire-retarding agents and/or agents for influencing the conductivity, whereby the properties of the components may be adapted to particular uses.

The second filler is likewise preferably used in a granular form and has an average grain size in the range of 50 $\mu$m to 10 mm, preferably from 100 $\mu$m to 4 mm.

In an additionally preferred embodiment of the invention, the proportion of the filler particles with a grain size of smaller than 20 $\mu$m in the second filler is selected to be less than 20% by volume.

The zone present between the visible side layer and the rear side layer has in preferred embodiments a polymer-depleted region with a layer thickness which is the same as or greater than the layer thickness of the visible side layer, wherein the polymer proportion of the polymer-depleted region is at least approximately 30% by weight less than in the visible side layer.

In view of the extremely high planarity of the inventive integral, board-like components and, in particular, their good mechanical properties as well, in particular their bending strength which can amount to 10 N/mm$^2$ without any problem, these components are suitable, in particular, for use as partitions, facing panels, table tops or working surfaces in the kitchen, washstand tops in the bathroom, door panels, furniture fronts or wall paneling, where required even as floor coverings.

A total density of 0.7 g/cm$^3$ or less which can easily be achieved contributes substantially to this broad spectrum of suitability, and likewise the surface of the visible side which is wear-resistant, stain-resistant, temperature-resistant and insusceptible to scratches or the high screw extraction strength (in accordance with RAL-RG 716/1; draft of April 1993) as well as the possibility of attaching the component with screws without prior drilling which the rear side of the molded part has.

For use in damp or humid rooms, in particular in the kitchen and bathroom, the property of the inventive components of not swelling with water is of particular importance.

The invention relates in addition to a process for the production of such a component with a visible side and a rear side which comprises the steps:

a) Filling a casting mold with a first hardenable casting mass which contains a first syrup with a first monomer and a first filler for forming the visible side layer;
b) further filling the casting mold with a second hardenable casting mass which contains a second syrup with a second monomer and filling a second inorganic filler into the casting mold, wherein the filler forms the rear side layer together with the second casting mass;
c) closing the casting mold; and
d) initiating the hardening of the first and the second casting masses, beginning on the visible side of the component;

wherein the first filler has a greater specific density than the syrup of the first casting mass, wherein the second filler has a specific density $\leq 0.6$ g/cm$^3$ and wherein the barrier layer is essentially impermeable for the first monomer and can be securely bonded to the visible side layer as well as the rear side layer.

At this point it should be pointed out that according to step b) the filling of the casting mold with the second hardenable casting mass and the inorganic filler can take place in any optional sequence. The individual components, i.e. casting mass and filler, can be introduced separately or as a mixture.

In a particularly preferred embodiment of the inventive process, a barrier layer is formed on the first casting mass forming the visible side layer subsequent to step a). During the later hardening of the casting masses, this barrier layer prevents monomer from being displaced out of the first casting mass and forming gas bubbles on the or rather in the visible side layer. The barrier layer prevents any transport and, therefore, any concentration of gaseous and liquid first monomer towards the rear side layer and thus ensures an essentially solid and cavity-free formation of the visible side layer.

Such layers may be polished after hardening and the removal of the component from the mold and this helps to achieve additional effects in the appearance of the visible side layer and increase the functional properties. This results, in particular, in the surface being suitable for working, for example, cutting directly on it without the knife thereby becoming blunt.

The simplest way of filling the casting mold with the second casting mass and the second filler consists in the fact that first of all the syrup of the second casting mass is filled evenly into the casting mold and subsequently the second filler in a separate step. On account of the low density of the second filler, this first of all swims on the top and sinks into the second casting mass with increasing filling of the casting mold with second filler.

It is of particular importance for a uniform quality of the visible side layer when the first casting mass is distributed in the mold with a uniform layer thickness.

The first syrup of the mixture preferably consists of a monomer and a prepolymer preferably dissolved therein which is particularly recommendable when acrylate systems are used in order to limit the shrinkage of the polymer volumes during hardening.

Acrylates and alkyl acrylates, which are particularly suitable in conjunction with the present invention, are described in detail, for example, in DE-24 49 656.

In order to achieve particularly good surface properties on the visible side, the first filler is allowed to settle prior to the complete hardening of the first casting mass in the mold, comparable to the manner described in DE-38 32 351-A1. The settling process may be aided where required by a shaking motion.

In order to prevent any formation of gas bubbles from evaporating monomer during the hardening phase, a film, preferably with a thickness of 10 to 100 μm, is preferably used as barrier layer, wherein the film is a polypropylene, polyethylene, a polyurethane or polyester film. Films having different compositions can also be used, of course, the only precondition being that the film bonds in an adequate manner with the visible side layer, on the one hand, and the rear side layer to be applied to the other surface, on the other hand, so that a solid, integral component is obtained. A secure bond is preferably formed with the barrier layer or the film of the barrier layer during the hardening process of the visible side layer and the rear side layer of the respective casting masses. In order to protect the film against mechanical impairments during the subsequent application of the second casting mass or, in particular, of the second filler, the barrier layer preferably comprises on the surface facing the rear side layer a protective layer in the form of a woven fabric or a fleece, in particular a glass fiber matting. The fleece is preferably selected such that it may easily be wetted and saturated with the second casting mass so that the insertion of the protective layer in the form of a fleece or woven fabric also prevents any predetermined breaking point being formed in the integral component.

As already discussed for the first casting mass, a mixture consisting of a monomer and a prepolymer is also preferred in the case of the second casting mass. The details specified in conjunction with the first casting mass apply for the selection of the monomer and the prepolymer, respectively.

Furthermore, it applies for the second monomer that this preferably has a boiling point of $\leq 145°$ C. and is preferably an acrylate, an alkyl acrylate, bifunctional acrylates, a styrene or a diene.

With this selection of the second monomer it is ensured that during the course of the hardening reaction which begins on the visible side a sufficiently high temperature is reached in the interior of the mold so that the second monomer is evaporated and, subsequently, condenses on the rear side of the mold and hardens there during the course of the hardening process and forms the polymer matrix proportion of the surface rear side layer. In this way, a surface of the rear side layer is attained which is essentially free from hollow spaces while in the interior of the component, i.e. further removed from the rear side surface, a polymer-depleted region is achieved.

The selection of the second filler is concentrated essentially on porous materials and/or hollow bodies which are preferably built up from $SiO_2$ materials.

The hardening of the casting masses is preferably initiated by way of an increase in temperature in the casting mold on the visible side, the first and the second syrups containing peroxides and/or azo compounds as initiators for the hardening reaction.

As specified above, the hardening is preferably controlled with respect to temperature such that the second monomer is evaporated and/or displaced and concentrated at the part of the casting mold adjacent to the rear side of the component, a temperature in the interior of the rear side layer of $\geq 140°$ C. preferably being attained.

In order to obtain highly planar components it is important for these to be cooled to below the boiling point of the monomer with the lowest boiling point with the same temperature for visible side and rear side. This ensures that with a closed mold, i.e. under pressure conditions, it remains below the boiling point of the monomer with the lowest boiling point and this monomer is also condensed and incorporated into the hardening process. This allows extremely low amounts of residual monomer in the component to be achieved which is noticeable, for example, due to a lack of a "plastic odor" of the component.

Furthermore, the component is preferably removed from the mold only after essentially complete hardening of the first and the second casting masses. This measure also serves to achieve the utmost planarity of the component.

In special applications it is of advantage when a glass fiber matting is applied to the charge of the second filler prior to closing the mold and thus forms part of the rear side surface. Due to the preferred production process described in the above, the second monomer not only condenses on the rear side surface but also passes in a condensed form into the glass fiber matting so that this is integrated essentially completely into the rear side surface.

As a result of the inventive construction of the integral, planar component and, in particular, due to the selection of the first and the second fillers, a bifunctional component with quite different properties on the visible and rear sides results. The visible side has, as is known from DE-38 32 351, an excellent serviceability, for example, in the kitchen, etc. and is, in particular, very resistant to wear and tear while the rear side has a considerably lower density and, above all, is easy to screw into which is shown by a particularly good screw extraction strength which is still to be discussed in the following. In view of the screw extraction strength and bending strength, the application of a fleece to the rear side layer prior to closure of the mold has proven to be particularly successful.

A particularly preferred, inventive, integral, board-like component has a layered structure which is described in more detail in the following, the term 'layered structure' being understood rather as a sequence of zones which merge into one another and cannot be clearly delimited:

The visible side layer contains adjacent to the utility surface a layer which has a high proportion of mineral fillers (first filler) in a PMMA matrix. The grain size can be varied within large ranges, and the filler proportion in this layer is in the range of between 50 and 90% by volume. This layer preferably has a coefficient of heat expansion of 20 to $40 \times 10^{-6}/°$ C. This can be followed by an additional layer or zone which has a density of between 1.3 and 2.2 $g/cm^3$ and which comprises the film described in the above and the inserted glass fiber fabric or fleece. This zone contains approximately 80% by weight of PMMA, 0.1% by weight of film material and 19.9% of finer proportions of the first filler.

This is followed by a zone with a very low density of approximately 0.4 $g/cm^3$ which consists essentially of a light-weight filler, such as, for example, hollow bodies, etc., the particles of the light-weight filler being bonded to one another via PMMA bridges. The size of the hollow bodies of the light-weight filler can be selected within broad ranges. The acrylic content is approximately 20% in volume corresponding to a weight content of approximately 50%.

Following on from this as an external rear side surface layer is a layer which contains a majority of light-weight filler or rather hollow bodies, the density of this layer differing considerably from the preceding zone. The density in this case increases to a value of approximately 0.6 $g/cm^3$, the acrylic content in this layer being approximately 35% by volume or 65% by weight. The light-weight filler is used, in this case, in the form of an expanded glass (obtainable under the trade name "Poraver" from the Dennert company, Schlüsselfeld). The film prevents the acrylate monomer from migrating into the Poraver layer during the polymerization of the visible side layer and forming cavities and hollow spaces on the visible side layer or rather in the visible side layer. The film itself may not, however, function as a separating layer as otherwise the visible side layer and the rear side layer will become mechanically separable. This does not, however, take place until films of too great a thickness are used and/or when these cannot form an adequate bond, in particular a covalent bond, with the hardening casting masses. The film must, on the one hand, be thin enough but, on the other hand, be mechanically stable enough so that holes cannot be pressed into the film due to the application of the expanded glass (Poraver). In order to be able to use very thin films in this case, an additional layer consisting of a fleece, in particular of glass fibers, can be applied to this film as a solution to this problem and this layer protects and stabilizes the film. This contributes, in addition, to a uniform thickness of the visible side layer. If the size of the particles of the first filler is selected, and also the viscosity of the first syrup accordingly, such that the first filler can settle, a syrup layer results adjacent to the visible side surface layer which is depleted of filler and reacts with a high heat release.

The second syrup layer located directly following the film begins to polymerize as a result of the temperature build-up in the visible side layer. The layer applied after the film and consisting of second casting mass and second filler contains a relatively large volume of gas, in which the methyl methacrylate monomer can evaporate as soon as the temperature of polymerization is sufficiently high on the visible side layer. The evaporated methyl methacrylate condenses, on the one hand, on the Poraver beads (expanded glass) as well as, on the other hand, on the rear side of the mold. The resulting foam formation of the second syrup sustains the polymerization right into the condensate layer on the rear side of the mold where the condensed monomer forms a continuous layer. Due to a corresponding temperature control during hardening, in particular an even cooling of the front and the rear sides down to a temperature below the boiling point of the monomer (in this case approximately 120° C.), an extremely low content of residual monomer can be achieved. Due to the insulating effect of the Poraver beads, a temperature of more than 140° C. is maintained in the interior of the component for a relatively long time and thus ensures a complete reaction of the monomers. In order to exploit this effect sufficiently, cooling must not, of course, take place too soon and the component not be removed from the mold too early. If the component is removed from the mold too early, the interior regions of the component are still in a viscoplastic state and the MMA partial pressure still present at this point of time can cause bubbles to form.

It is clear from the above that at the beginning of production the rear side of the mold must not be too hot as, otherwise, a condensation of the monomer contents, which are evaporated due to the temperature build-up on the visible side layer, is prevented and the polymerization begins here too early.

In the following, a preferred production process for an inventive, integral, board-like component will be explained by way of example, as well as the outstanding properties of the inventive components on the basis of various examples.

A casting mass is produced according to the following formula for forming the visible side layer:

FORMULA 1

20% by weight of a syrup, consisting of 23% by weight of PMMA (Degalan 51/03 of the Degussa AG) in MMA which contains, in addition, a customary cross-linking agent;

0.2% of a peroxide initiator system, approximately 80% by weight of a quartz sand with a screen size of 0.01 mm to 1 mm.

To form the rear side layer, a syrup having the following composition is added to the mold already filled with the first casting mass:

FORMULA 2

An MMA phase which contains 10% by weight of PMMA and, in addition, customary cross-linking agents is mixed with an initiator system in the weight ratio of 50:1. As in the previous formula, bis-t-butyl cyclohexyl peroxodicarbonate (BCHPC), lauroyl peroxide and t-butyl perbenzoate can be used in this case as initiators in approximately equal proportions.

Approximately the same weight proportion of expanded glass (second filler) as syrup is added to the form, this glass having a density of 0.2 g/cm$^3$ and a grain size of 100 $\mu$m to 4 mm. Before the syrup with the formula 2 (second casting mass) is added to the mold, the layer is covered with a film having a layer thickness of 20 $\mu$m and, subsequently, with a glass fiber matting. The filling height for the casting mass according to the visible side formula in the mold is 7 mm and the filling height for the casting mass consisting of the second syrup and the expanded glass is approximately 33 mm. The mold is closed and the hardening of the component initiated by the application of heat to the visible side. The temperature control was selected such that in the interior of the component a mold temperature of more than 140° C. occurs so that the MMA of the second casting mass begins to boil and condenses on the casting mold adjacent to the rear side. In order to complete the hardening, the mold is slowly cooled (2° C./min) after approximately 30 minutes with the same temperatures on the visible and rear sides until a temperature of less than 120° C. is reached. The mold is kept at this temperature or below this temperature for at least 10 minutes. Only then is the mold opened and the component removed.

For this component, the following properties result for the visible side during tests:

very good stain resistance, in particular with respect to dyes, greases or oils, lyes and acids etc.;

no water whitening effect, not even when subjected to alternating stress with hot and cold water (also in the polished state).

A screw extraction strength in the range of 50 N/mm to 70 N/mm is obtained on the rear side. The comparative value achieved for chipboard of the same thickness is approximately 53 N/mm (kitchen working surface in the form of chipboard with a high-pressure laminated coating; the Duropal company).

These boards produced with a measurement of 1 m side edge have a planarity, with which a maximum deviation of 0.5 mm can be measured over a length of 1 m. The planarity is determined at a temperature of 23±2° C. and 50±5% relative humidity. The German Industrial Standards used for determining the deviations are DIN 68761 and DIN 68763 or DIN EN 438 in an analogous manner.

The boards produced in accordance with the preceding example have in comparison with similarly structured boards, which have, however, been obtained as a result of an adhesive process, a curvature, measured in the diagonal of the board, of at the most 1 mm whereas glued boards or melamine resin boards have a deviation of 2.4 mm.

If the formula for the visible side is altered, for example, as follows:

FORMULA 3

30% by weight of a syrup, containing 23% by weight of PMMA (Degalan 51/03 of the Degussa AG) as well as small amounts of a cross-linking agent and a peroxide initiator system and 70% by weight of the quartz sand described above, boards which are already bent are obtained during production.

If a board is produced merely using the comparative formula for the visible side layer and this is glued to corresponding boards which have been produced in accordance with the rear side formula, curvatures of 2.4 mm over the diagonal of the 1×1 m board or more are likewise obtained during the alternating temperature test.

What is claimed is:

1. Integral, board-like component, comprising a visible side and a rear side, wherein the visible side comprises a layer comprising a polymer matrix filled with a first, inorganic filler, its specific density being greater than the specific density of the polymer matrix, characterized in that the content of the first filler in the visible side layer is 50 to 90% by volume of said layer, that the rear side comprises a rear side layer formed from a polymer matrix filled with a second, inorganic filler, wherein the proportion of the polymer matrix in the rear side layer in % by volume differs quantitatively by 20% at the most from the volume content of the polymer matrix in the visible side layer and wherein the specific density of the second filler is $\leqq 0.6$ g/cm$^3$.

2. Component as defined in claim 1, characterized in that the rear side layer comprises pores.

3. Component as defined in claim 1, characterized in that a layer comprising reinforcing fibers in a polymer matrix is present between the visible side layer and the rear side layer.

4. Component as defined in claim 1, characterized in that the rear side layer and the visible side layer are separated by a zone comprising a barrier layer, said barrier layer being essentially impermeable for a monomer that forms the polymer matrix of the visible side layer.

5. Component as defined in claim 4, characterized in that the barrier layer comprises a film of acrylate polymer, acrylonitrile butadiene styrene copolymer, polystyrene, PVC, polyvinyl acetate, polypropylene, polyethylene, polyurethane or polyester.

6. Component as defined in claim 4, characterized in that the zone on the side of the barrier layer facing away from the visible side comprises a protective or reinforcing layer.

7. Component as defined in claim 6, characterized in that the protective or reinforcing layer comprises fiber fleece which is a glass fiber matting.

8. Component as defined in claim 4, wherein said barrier layer is covalently bonded with the polymer matrix of the visible side layer and/or of the rear side layer.

9. Component as defined in claim 4, characterized in that the zone has a polymer-depleted region with a layer thickness equal to or greater than the layer thickness of the visible side layer, wherein the polymer proportion of the polymer-depleted region is at least approximately 30% by weight less than in the visible side layer.

10. Component as defined in claim 1, characterized in that the first filler is a mineral filler with a Mohs' hardness of $\geq 4$ and comprising $SiO_2$ materials selected from quartz, cristobalite, or glass, silicon nitride, silicon carbide, corundum and/or granite.

11. Component as defined in any one of claim 1, characterized in that the first filler is granular and/or lamellar.

12. Component as defined in claim 11, characterized in that the granular filler has a grain size of up to 5 mm.

13. Component as defined in claim 11, characterized in that the surface of the visible side layer is polished after hardening of the component.

14. Component as defined in claim 1, characterized in that the visible side layer has a thickness of at least approximately 1 mm.

15. Component as defined in claim 1, characterized in that the polymer matrix of the visible side layer consists essentially of polyacrylates, polyester or an epoxy resin.

16. Component as defined in claim 1, characterized in that the polymer matrix of the rear side layer consists essentially of polyacrylates, polyester or an epoxy resin.

17. Component as defined in claim 1, characterized in that particles of the second filler have a pressure resistance of 5 to 25 kN.

18. Component as defined in claim 17, wherein the particles have a pressure resistance of 10 to 25 kN.

19. Component as defined in claim 1, characterized in that the second filler is used in a mixture with reinforcing fibers, fire-retarding agents and/or agents for influencing the conductivity.

20. Component as defined in claim 1, characterized in that the second filler is granular and has an average grain size in the range of 50 $\mu$m to 10 mm.

21. Component as defined in claim 20, wherein the average grain size is 100 $\mu$m to 4 mm.

22. Component as defined in claim 20, characterized in that the proportion of the filler particles with a grain size $\leq 20$ $\mu$m in the second filler is <20% by weight.

23. Component as defined in claim 1 comprising a partition, facing panel, table top or working surface in the kitchen, washstand top in the bathroom, door panel, furniture front or wall paneling.

* * * * *

UNITED STATES PATENT AND TRADEMARK OFFICE
CERTIFICATE OF CORRECTION

PATENT NO. : 6,177,179 B1
DATED : January 23, 2001
INVENTOR(S) : Friedrich Schock et al.

Page 1 of 1

It is certified that error appears in the above-identified patent and that said Letters Patent is hereby corrected as shown below:

Column 11,
Line 23; delete "any one of".

Signed and Sealed this

Twenty-fifth Day of September, 2001

Attest:

*Attesting Officer*

NICHOLAS P. GODICI
*Acting Director of the United States Patent and Trademark Office*